(12) United States Patent
Cho

(10) Patent No.: US 11,196,594 B2
(45) Date of Patent: Dec. 7, 2021

(54) PROBABILISTIC SIGNAL SHAPING USING MULTIPLE CODEBOOKS

(71) Applicant: Nokia Solutions and Networks OY, Espoo (FI)

(72) Inventor: Joon Ho Cho, Holmdel, NJ (US)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 16/288,719

(22) Filed: Feb. 28, 2019

(65) Prior Publication Data

US 2020/0280468 A1 Sep. 3, 2020

(51) Int. Cl.
*H04L 25/03* (2006.01)
*H04B 10/00* (2013.01)
(Continued)

(52) U.S. Cl.
CPC ..... *H04L 25/03828* (2013.01); *H04B 7/0456* (2013.01); *H04B 10/25* (2013.01);
(Continued)

(58) Field of Classification Search
CPC ............. H04L 1/0042; H04L 25/03828; H04L 27/3411; H04B 7/0456; H04B 7/0482; H04B 10/516
See application file for complete search history.

(56) References Cited

U.S. PATENT DOCUMENTS 4,348,659 A 9/1982 Fujimori et al.
4,593,267 A 6/1986 Kuroda et al.
(Continued)

FOREIGN PATENT DOCUMENTS

WO WO02052772 A2 7/2002
WO WO2015088843 A1 6/2015

OTHER PUBLICATIONS

Jörgen Ahlberg ("Source Coding Theory", TSBK01 Image Coding and Data Compression, Swedish DefenceResearch Agency (FOI), 2003) (Year: 2003).*
(Continued)

*Primary Examiner* — Aristocratis Fotakis
(74) *Attorney, Agent, or Firm* — Mendelsohn Dunleavy, P.C.; Yuri Gruzdkov

(57) ABSTRACT

A communication system in which multiple shaping codes are selectively and iteratively used to encode a data frame such that possible energy inefficiencies associated with the use of constant-probability codes and/or transmission of dummy constellation symbols can be relatively small. In an example embodiment, the used shaping codes have different respective code rates, and a code selector of the shaping encoder operates to select one of the shaping codes by adaptively matching the rate of the code to the effective rate needed to efficiently encode the unprocessed portion of the data frame. The encoding is carried out in a manner that enables the shaping decoder to unequivocally determine the shaping codes that have been used for encoding each particular data frame based on the same rate-matching criteria as those used by the shaping encoder. At least some embodiments advantageously lend themselves to being implemented using circuits of relatively low complexity.

22 Claims, 9 Drawing Sheets

(51) Int. Cl.
| | |
|---|---|
| H04B 14/00 | (2006.01) |
| H04B 7/0456 | (2017.01) |
| H04L 1/00 | (2006.01) |
| H04B 14/02 | (2006.01) |
| H04B 10/25 | (2013.01) |

(52) U.S. Cl.
CPC ......... *H04B 14/004* (2013.01); *H04B 14/023* (2013.01); *H04L 1/0042* (2013.01)

(56) References Cited

U.S. PATENT DOCUMENTS

| | | | | |
|---|---|---|---|---|
| 5,253,097 | A | * | 10/1993 | Naito ............... H04B 10/61 398/204 |
| 6,009,108 | A | | 12/1999 | Takehara et al. |
| 6,185,246 | B1 | | 2/2001 | Gilhousen |
| 7,957,482 | B2 | | 6/2011 | Golitschek Edler Von Elbwart et al. |
| 8,941,515 | B1 | | 1/2015 | Kodama |
| 9,036,694 | B2 | | 5/2015 | Zhou et al. |
| 9,036,742 | B2 | | 5/2015 | Butussi et al. |
| 9,143,239 | B2 | | 9/2015 | Yamazaki |
| 9,143,377 | B2 | | 9/2015 | Sagi |
| 10,069,519 | B1 | * | 9/2018 | Millar ............... H03M 7/3062 |
| 10,608,749 | B1 | * | 3/2020 | Morero ............ H04B 10/516 |
| 2003/0039318 | A1 | | 2/2003 | Tong et al. |
| 2003/0055656 | A1 | * | 3/2003 | Tasaki ............... G10L 19/167 704/500 |
| 2003/0123564 | A1 | * | 7/2003 | Ophir ............... H04L 25/4975 375/265 |
| 2004/0005011 | A1 | | 1/2004 | Trott et al. |
| 2004/0008794 | A1 | | 1/2004 | McClellan |
| 2004/0217888 | A1 | | 11/2004 | Noda et al. |
| 2007/0109160 | A1 | | 5/2007 | Pisarevsky et al. |
| 2007/0248148 | A1 | | 10/2007 | Dent |
| 2009/0141791 | A1 | | 6/2009 | Ungerboeck et al. |
| 2011/0200125 | A1 | * | 8/2011 | Multrus ............ H03M 7/3088 375/259 |
| 2012/0066436 | A1 | * | 3/2012 | Yang ................. G11C 16/26 711/103 |
| 2012/0250785 | A1 | | 10/2012 | Vidal et al. |
| 2014/0133865 | A1 | * | 5/2014 | Reimer ............. H04B 10/532 398/152 |
| 2014/0369680 | A1 | * | 12/2014 | Oveis Gharan ..... H04L 1/0042 398/27 |
| 2015/0071640 | A1 | | 3/2015 | Batshon et al. |
| 2016/0080192 | A1 | | 3/2016 | Stadelmeier et al. |
| 2016/0087651 | A1 | | 3/2016 | Lu |
| 2016/0233979 | A1 | * | 8/2016 | Koike-Akino ..... H03M 13/1111 |
| 2016/0315704 | A1 | | 10/2016 | Djordjevic et al. |
| 2018/0026725 | A1 | * | 1/2018 | Cho .................... H04B 10/564 714/776 |
| 2018/0083716 | A1 | * | 3/2018 | Cho .................... H04B 7/0456 |
| 2019/0052511 | A1 | * | 2/2019 | Gultekin ........... H04L 1/0068 |
| 2019/0280809 | A1 | * | 9/2019 | Cho .................... H04B 10/2543 |

OTHER PUBLICATIONS

Tsuyoshi Yoshida, Magnus Karlsson, and Erik Agrell "Hierarchical Distribution Matching for Probabilistically Shaped Coded Modulation", Dec. 26, 2018, IEEE (Year: 2018).*
Richard E. Blahut and Ralf Koetter, "Codes, Graphs and Systems", University of Illinois at Urbana-Champai, Copyright 2002 by Springer Science+Business Media New York (Year: 2002).*
Forney, G. David, et al. "The V. 34 high speed modem standard." IEEE Communications Magazine 34.12 (1996): 28-33.
Cho, Junho "Prefix-free code distribution matching for probabilistic constellation shaping." IEEE Transactions on Communications (2019).
Buchali, Fred, et al. "Rate adaptation and reach increase by probabilistically shaped 64-QAM: An experimental demonstration." Journal of Lightwave Technology 34.7 (2016): 1599-1609.
Cho, Junho, et al. "High spectral efficiency transmission with probabilistic shaping." 2017 European Conference on Optical Communication (ECOC). IEEE, 2017.
Ghazisaeidi, Amirhossein, et al. "65Tb/s transoceanic transmission using probabilistically-shaped PDM-64QAM." ECOC 2016—Post Deadline Paper; 42nd European Conference on Optical Communication. VDE, 2016.
Cho, Junho, et al. "Trans-atlantic field trial using high spectral efficiency probabilistically shaped 64-QAM and single-carrier real-time 250-GB/s 16-QAM." Journal of Lightwave Technology 36.1 (2018): 103-113.
Olsson, Samuel L.I., et al. "Probabilistically shaped PDM 4096-QAM transmission over up to 200 km of fiber using standard intradyne detection." Optics express 26.4 (2018): 4522-4530.
Böcherer, Georg, et al. "Bandwidth efficient and rate-matched low-density parity-check coded modulation." IEEE Transactions on Communications 63.12 (2015): 4651-4665.
Schulte, Patrick, et al. "Constant composition distribution matching." IEEE Transactions on Information Theory 62.1 (2015): 430-434.
Cho, Junho, et al., "Normalized generalized mutual information as a forward error correction threshold for probabilistically shaped QAM." 2017 European Conference on Optical Communication (ECOC). IEEE, 2017.
Zhang, Lei M., et al. "Staircase Codes With 6% to 33% Overhead." Journal of Lightwave Technology 32.10 (2014): 1999-2002.
Cho, Junho, et al. "Probabilistic constellation shaping for optical fiber communications." Journal of Lightwave Technology 37.6 (2019): 1590-1607.
Böcherer, Georg, et al. "Fast probabilistic shaping implementation for long-haul fiber-optic communication systems." 2017 European Conference on Optical Communication (ECOC) IEEE, 2017. (slides).
Jardel, Fanny, et al. "Exploring and experimenting with shaping designs for next-generation optical communications." Journal of Lightwave Technology 36.22 (2018): 5298-5308.
Bocherer, Georg, et al. "Capacity achieving modulation for fixed constellations with average power constraint." 2011 IEEE International Conference on Communications (ICC). IEEE, 2011.
Schulte, Patrick, et al. "Divergence-optimal fixed-to-fixed length distribution matching with shell mapping." IEEE Wireless Communications Letters 8.2 (2019): 620-623.
Gültekin, Yunus Can, et al. "Constellation shaping for IEEE 802. 11." 2017 IEEE 28th Annual International Symposium on Personal, Indoor, and Mobile Radio Communications (PIMRC). IEEE, 2017.
Gultekin, Y. C., et al. "On constellation shaping for short block lengths." 2018 Symposium on Information Theory and Signal Processing in the Benelux (SITB 2018). University of Twente, 2018.
Cho, Junho, et al., "Multi-rate prefix-free code distribution matching." 2019 Optical Fiber Communications Conference and Exhibition (OFC). IEEE, 2019.
ITU-T Telecommunications Standard "V.34—A modem operating at data signaling rates of up to 33,600 bit/s for use on the general switched telephone network and on leased point-to-point 2-wire telephone-type circuits", approved Feb. 1, 1998.
Stojkovic, Nino. "ADSL analog front end." AUTOMATIKA-ZAGREB—47.1/2 (2006): 59-67.
Nannapaneni, Chandana, et al. "Constellation Shaping for Communication Channels with Quantized Outputs," 45th Annual Conference on Information Sciences and Systems (CISS), 2011 pp. 1-6.
Arafa, T., et al., "Performance of combined constellation shaping and bit interleaved coded modulation with iterative decoding (BICM-ID)," Advances in Radio Science, 2011, pp. 195-201.
Vandana, A., et al., "A Review of Constellation Shaping and Bicm-id of Ldpc Codes for DVB-S2 Systems," International Journal of Advanced Information And Communication Technology (IJAICT) vol. 1, No. 1, 2014, pp. 98-102.
Arabaci, Murat, et al., "Nonbinary LDPC-Coded Modulation for High-Speed Optical Fiber Communication Without Bandwidth Expansion," IEEE Photonics Journal, vol. 4, No. 3, 2012, pp. 728-734.
Kschischang, Frank R., et al., "Optimal Nonuniform Signaling for Gaussian Channels," IEEE Transactions on Information Theory, vol. 39, No. 3, 1993, pp. 913-929.

(56) References Cited

OTHER PUBLICATIONS

Hu, T. C., et al., "Optimal Computer Search Trees and Variable-Length Alphabetical Codes," SIAM Journal on Applied Mathematics, Society for Industrial and Applied Mathematics, vol. 21, No. 4, pp. 514-532.

Shevchenko, A. et al.,, "A Lower Bound on the per Soliton Capacity of the Nonlinear Optical Fibre Channel" IEEE Inf. Theory Workshop, Fall 2015.

Haus, Hermann A. et al. "Solitons in optical communications." Reviews of modem physics 68.2 (1996): 423.

Yousefi, Mansoor I. "Information transmission using the nonlinear Fourier transform, Part I-Part III" IEEE Transactions on Information Theory 60.7 (2014): 4312-4328.

Cisco Global Cloud Index: Forecast and Methodology, 2015-2020, White Paper, 2016.

Doran, N. et al. "Solitons in optical communications." IEEE journal of quantum electronics 19.12 (1983): 1883-1888.

Hasegawa, Akira et al. "Eigenvalue communication." Journal of lightwave technology 11.3 (1993): 395-399.

Hranilovic, Steve et al. "Optical intensity-modulated direct detection channels: signal space and lattice codes." IEEE Transactions on Information Theory 49.6 (2003): 1385-1399.

Liu, Tao et al. "On the optimum signal constellation design for high-speed optical transport networks." Optics express 20.18, 20396-20406 (2012).

International Search Report and Written Opinion; dated Feb. 16, 2018 for PCT Application No. PCT/US2017/051564.

Pickholtz, R., et al. "Theory of spread-spectrum communications-a tutorial." IEEE transactions on Communications 30.5 (1982): 855-884.

Invitation to Pay Additional Fees; dated Dec. 22, 2017 for PCT Application No. PCT/US2017/051564.

Fehenberger, T. et al. "On Probabilistic Shaping of Quadrature Amplitude Modulation for the Nonlinear Fiber Channel," Journal of Lightwave Technology, vol. 34, No. 21, pp. 5063-5073, Nov.1, 1 2016.

D. Raphaeli and A. Gurevilz, "Constellation shaping for pragmatic turbo-coded modulation with high spectral efficiency," in IEEE Transactions on Communications, vol. 52, No. 3, pp. 341-345, Mar. 2004.

Yankov, Metodi P., et al. "Constellation shaping for WDM systems using 256QAM/1024QAM with probabilistic optimization." Journal of Lightwave Technology 34.22 (2016): 5146-5156.

Chandrasekhar, S. et al., "High-spectral-efficiency transmission of PDM 256-QAM with Parallel Probabilistic Shaping at Record Rate-Reach Trade-offs", ECOC 2016—Post Deadline Paper; 42nd European Conference on Optical Communication, Dusseldorf, Germany (Sep. 2016): 3 pages.

Entropy encoding, wikipedia.org, 2002 [retrieved on Aug. 25, 2020] Retrieved from the Internet: <URL: https://en.wikipedia.org/wiki/Entropy_encoding> (2 pages).

Error detection and correction, wikipedia.org, 2002 [retrieved on Aug. 25, 2020] Retrieved from the Internet: <URL: https://en.wikipedia.org/wiki/Error_detection_and_correction> (12 pages).

Huffman coding, wikipedia.org, 2001 [retrieved on Aug. 25, 2020] Retrieved from the Internet: <URL: https://en.wikipedia.org/wiki/Huffman_coding> (12 pages).

Parity bit, wikipedia.org, 2003 [retrieved on Aug. 25, 2020] Retrieved from the Internet: <URL: https://en.wikipedia.org/wiki/Parity_bit> (8 pages).

\* cited by examiner

100

210

220

230

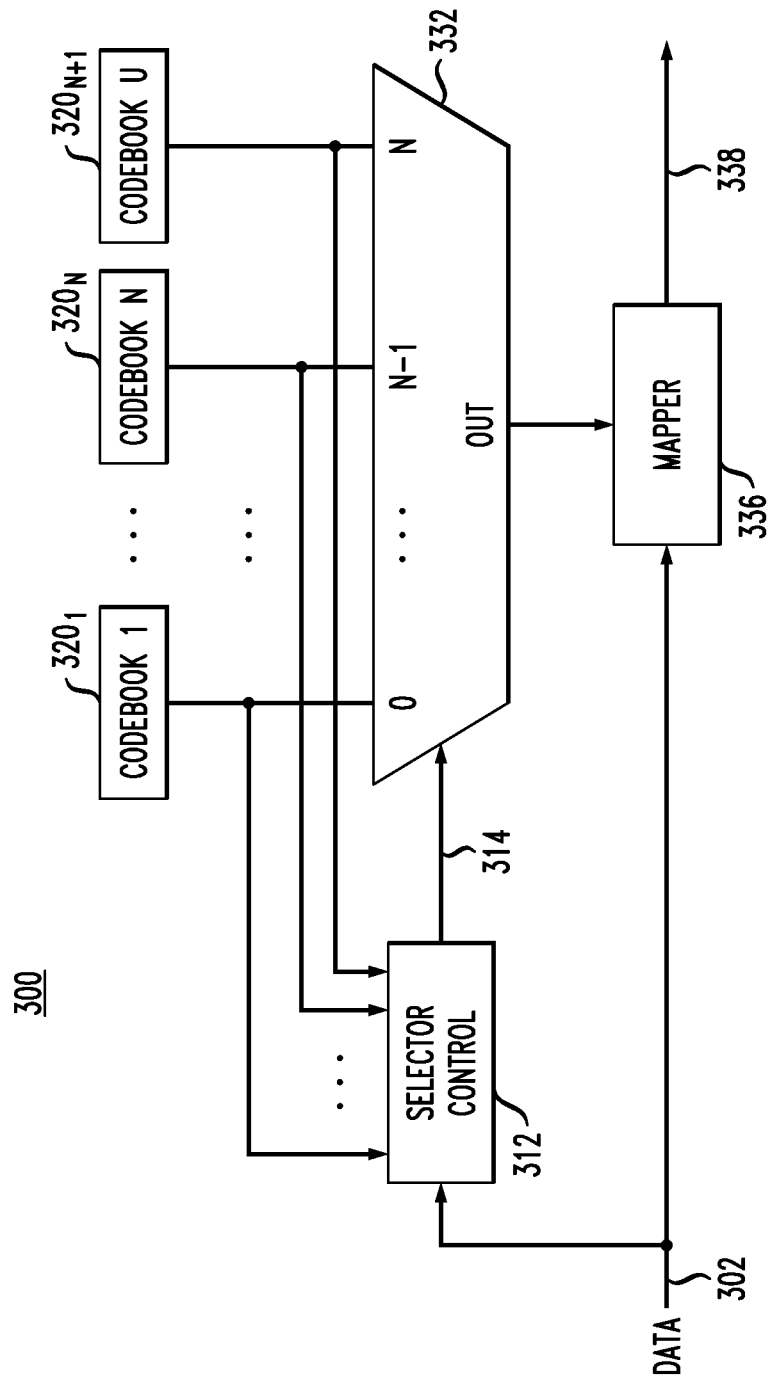

FIG. 4A
410

VIVO C1

| BIT-WORD | CODEWORD |
|---|---|
| 0 | 1111111 |
| 100 | 1111113 |
| 101 | 111113 |
| 110 | 11113 |
| 1110 | 1113 |
| 11110 | 113 |
| 111110 | 13 |
| 111111 | 3 |

FIG. 4B
420

VIVO C2

| BIT-WORD | CODEWORD |
|---|---|
| 0 | 1111 |
| 100 | 1113 |
| 101 | 113 |
| 110 | 3111 |
| 1110 | 13 |
| 11110 | 3113 |
| 111110 | 313 |
| 111111 | 33 |

FIG. 4C
430

FIFO U

| BIT-WORD | CODEWORD |
|---|---|
| 0 | 1 |
| 1 | 3 |

600

PROBABILISTIC SIGNAL SHAPING USING MULTIPLE CODEBOOKS

BACKGROUND

Field

Various example embodiments relate to communication equipment and, more specifically but not exclusively, to methods and apparatus for transmitting information using probabilistic signal shaping.

Description of the Related Art

This section introduces aspects that may help facilitate a better understanding of the disclosure. Accordingly, the statements of this section are to be read in this light and are not to be understood as admissions about what is in the prior art or what is not in the prior art.

Energy-based shaping of a symbol stream can beneficially provide transmit-energy savings often referred to as the shaping gain. Such shaping of a symbol stream can, e.g., lower the required values of a signal-to-noise ratio (SNR) for communications. In schemes for such shaping, constellation symbols of a relatively large energy are transmitted less frequently than constellation symbols of a relatively small energy. For example, when constellation symbols are transmitted over a linear communication channel, with Gaussian random noise, a rate of symbol occurrence that approximates a continuous Gaussian distribution of the operative constellation can produce a theoretical shaping gain approaching 1.53 dB, which can be used to achieve a corresponding reduction of the required SNR.

Signal-shaping systems that lend themselves to being implemented using digital circuits of relatively small size and/or relatively low complexity are especially desirable.

SUMMARY OF SOME SPECIFIC EMBODIMENTS

Herein, various embodiments of a communication system and components thereof use multiple shaping codes to iteratively encode a data frame such that possible energy inefficiencies associated with the use of constant-probability codes and/or transmission of dummy constellation symbols can be relatively small. Some embodiments may also use multiple constellations. In an example embodiment, the used shaping codes have different respective code rates, and a code selector of the shaping encoder operates to select one of the shaping codes by adaptively matching the rate of the code to the effective rate needed to efficiently encode the unprocessed portion of the data frame. The encoding is carried out in a manner that enables the shaping decoder to unequivocally determine the shaping codes that have been used for encoding each particular data frame based on the same rate-matching criteria as those used by the shaping encoder.

Advantageously, at least some embodiments lend themselves to being implemented using circuits of relatively low complexity, e.g., by providing the shaping codes in the form of relatively small look-up tables and using circuits that do not require high-precision arithmetic to realize the selector switch and/or switch controller of the code selector.

According to an example embodiment, provided is an apparatus comprising: a shaping encoder comprising a selector and a constellation mapper, the constellation mapper being capable of generating a frame of symbols of a constellation in response to receipt of an input block of bits, the selector being capable of causing the constellation mapper to generate the frame by selectively mapping bits of the input block into symbols of the frame using a plurality of shaping codes, each shaping code mapping bits into symbols of the constellation such that some symbols of higher energy have a lower probability of being generated by the mapping than other symbols of lower energy; and a data transmitter coupled to the shaping encoder to transmit a modulated signal carrying the frame.

According to another example embodiment, provided is an apparatus comprising: a data receiver configured to generate a sequence of digital samples in response to receipt of a modulated signal carrying a frame of symbols of a constellation, the digital samples representing measurements of the symbols; and a shaping decoder that comprises a constellation demapper and a selector, the selector being configured to cause the constellation demapper to selectively use a plurality of shaping codes to generate an output block of bits in response to the sequence of digital samples; and wherein each of the shaping codes maps bits into symbols of the constellation such that some symbols of higher energy have a lower probability of being generated by the mapping than other symbols of lower energy.

BRIEF DESCRIPTION OF THE DRAWINGS

Other aspects, features, and benefits of various disclosed embodiments will become more fully apparent, by way of example, from the following detailed description and the accompanying drawings, in which:

FIG. 3 shows a block diagram of a shaping encoder that can be used in a data transmitter of the communication system of FIG. 1 according to an embodiment;

FIGS. 4A-4C show example codebooks that can be used in the shaping encoder of FIG. 3 according to an embodiment;

DETAILED DESCRIPTION

At least some embodiments may benefit from certain features disclosed in U.S. Patent Application Publication No. 2018/0083716, which is incorporated herein by reference in its entirety.

Herein, the generation and/or transmission of a symbol stream in which various symbols appear with different probabilities even though the various input data segments encoded onto said symbol stream have about equal probabilities is referred to as probabilistic constellation shaping (PCS). Often, preferable types of PCS generate symbol streams in which higher energy symbols are less probable than lower energy symbols. In some embodiments, forward-error-correction (FEC) encoding may be used in a manner that causes such energy shaping to be largely maintained in the corresponding FEC-encoded symbol stream. In embodiments of coherent optical fiber communication systems and optical data transmitters and receivers thereof, the PCS can advantageously be used to (i) lower degradations related to nonlinear optical effects, which are more prominent at larger energies, (ii) lower a required SNR, and/or (iii) enable higher information communication rates. Various embodiments may apply the PCS to various quadrature amplitude modulation (QAM) constellations and/or other suitable symbol constellations.

Figure 1:
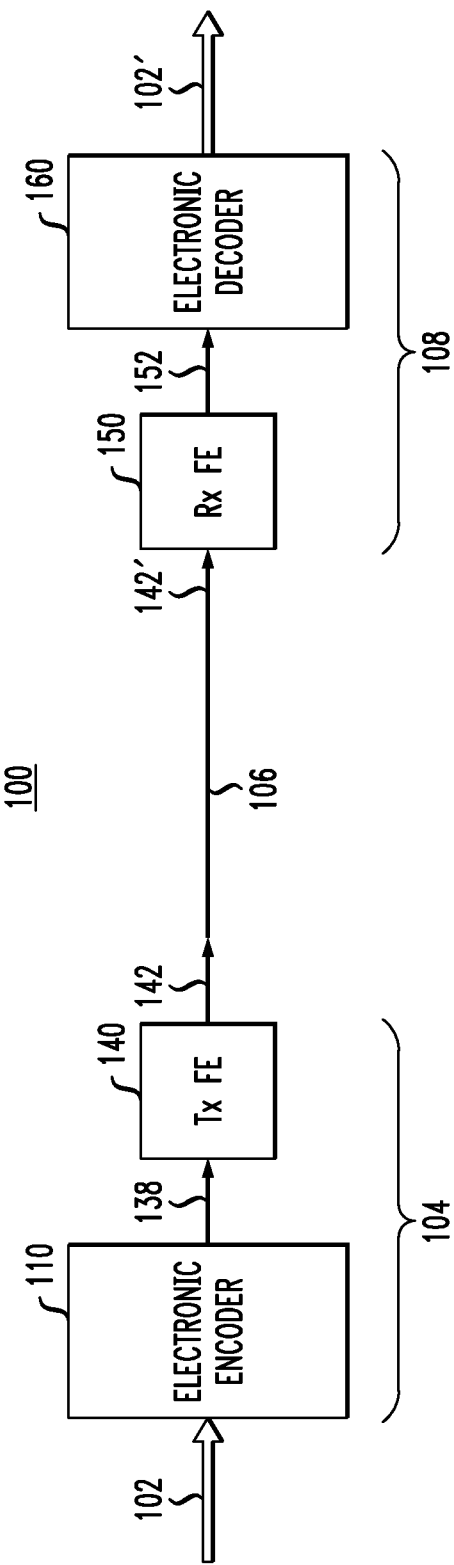
FIG. 1 shows a block diagram of a communication system in which various embodiments can be practiced.

FIG. 1 shows a block diagram of a communication system 100 in which various embodiments can be practiced. System 100 comprises a data transmitter 104 and a data receiver 108 that are coupled to one another by way of a communication link 106. In various embodiments, communication link 106 can be an optical link (e.g., implemented using one or more spans of optical fibers, e.g., single-mode optical fibers), a wireless link, or a wire-line link. If the communication link 106 is an optical fiber link, data receiver 104 and transmitter 106 may be, e.g., a coherent optical receiver and transmitter, respectively (e.g., see FIGS. 9-10).

System 100 implements probabilistic constellation shaping (PCS) using an electronic encoder 110 at data transmitter 104 and an electronic decoder 160 at data receiver 108. Encoder 110 operates to transform an input data stream 102 into a corresponding sequence 138 of digital constellation symbols in which different constellation symbols may appear with different respective rates of occurrence when the input data stream 102 is a random or quasi-random input data stream. A transmitter front-end (FE) circuit 140 then uses sequence 138 to generate a corresponding modulated communication signal 142 suitable for transmission over link 106 and having encoded thereon the constellation symbols of sequence 138. In some embodiments for optical communications, the encoder 110 and portions of FE circuit 140 may together form an electronic data driver for an optical data modulator of data transmitter 104.

Link 106 imparts noise and possibly other linear and/or nonlinear signal distortions onto communication signal 142 and delivers a resulting impaired (e.g., noisier and distorted) communication signal 142' to a receiver FE circuit 150. FE circuit 150 operates to convert the received communication signal 142' into a corresponding sequence 152 of digital samples. Decoder 160 then converts sequence 152 into an output data stream 102'. Provided that the signal processing in system 100 produces no errors, output data stream 102' is the same as input data stream 102.

Example embodiments of a shaping encoder that can be used to perform PCS in encoder 110 are described below in reference to FIGS. 3-5. Example embodiments of a shaping decoder that can be used to undo PCS in decoder 160 are described below in reference to FIGS. 6-7.

If signal 142' is relatively noisy and/or distorted relatively strongly, then additional measures can be taken to cause output data stream 102' to have an acceptably low bit-error rate (BER). For example, forward error correction (FEC) can be used at encoder 110 and decoder 160 as described in the above-cited U.S. Patent Application Publication No. 2018/0083716.

Implementation details of FE circuits 140 and 150 depend on the type of link 106 and are known to those skilled in the pertinent art. For example, when link 106 is an optical link established over an optical fiber or fiber-optic cable, FE circuit 140 can be implemented using a conventional optical IQ modulator (e.g., see FIG. 9), whereas FE circuit 150 can be implemented using a conventional coherent (e.g., intradyne or homodyne) optical receiver (e.g., see FIG. 10). When link 106 is a wire-line link, FE circuits 140 and 150 can be implemented, e.g., as described by N. Stojkovic in the article entitled "ADSL Analog Front End," published in AUTOMATIKA v. 47 (2006), no. 1-2, pp. 59-67, which is incorporated herein by reference in its entirety.

Typically, FE circuit 140 largely maintains the PCS produced by electronic encoder 110. That is, in an example embodiment, symbols of higher energy have a lower probability than symbols of lower energy in the data modulated signal 142 applied by FE circuit 140 to the communication link 106.

Figure 2A:
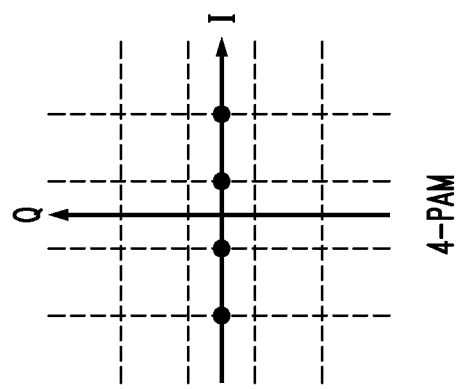
FIGS. 2A-2C graphically show example constellations that can be used in the communication system of FIG. 1 according to some embodiments.
Figure 2B:
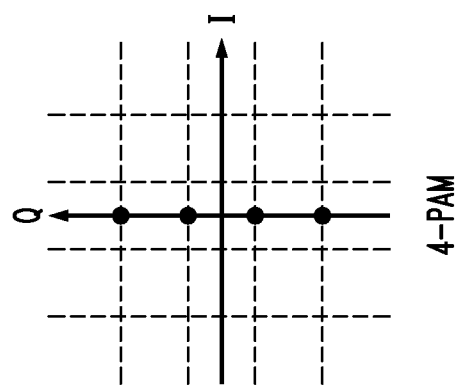
Figure 2C:
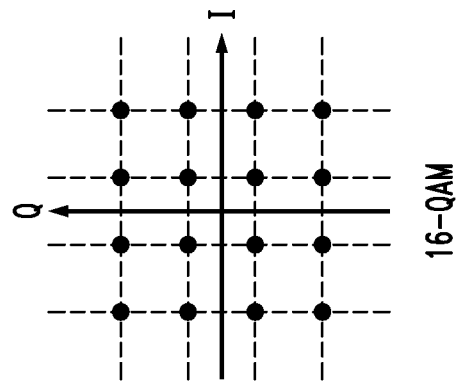

FIGS. 2A-2C graphically show several constellations that can be used in system 100 according to several example embodiments. Each of the shown constellations is depicted as a set of constituent constellation points on a complex plane whose axes are labeled as the I (in-phase) axis and the Q (quadrature) axis.

FIG. 2A graphically shows a 4-PAM (pulse-amplitude-modulation) constellation 210, e.g., for short-reach fiber-optical communications. The four constellation points of constellation 210 are all located on the I-axis and can be represented by the real numbers −3, −1, +1, and +3. Each of the constellation points can be used to encode two bits. In an example bit assignment, the first of the two bits (e.g., the most-significant bit, MSB) can represent the sign of the corresponding real number, and the second of the two bits (e.g., the least-significant bit, LSB) can represent the absolute value (e.g., the amplitude) of the corresponding real number. In this bit assignment scheme, the two bits assigned to a constellation point can be referred to as the sign bit and the amplitude bit, respectively.

FIG. 2B graphically shows a 4-PAM constellation 220. The four constellation points of constellation 220 are all located on the Q-axis and can be represented by the imaginary numbers $-3j$, $-j$, $+j$, and $+3j$. Each of the constellation points can be used to encode two bits in a manner similar to that of constellation 210 (FIG. 2A).

FIG. 2C graphically shows a 16-QAM (quadrature-amplitude-modulation) constellation 230. A person of ordinary skill in the art will understand that constellation 230 can be generated using a combination of constellations 210 and 220. For example, constellation 230 can be conceptually viewed as constellation 210 (FIG. 2A) in which each constellation point is split into four points using constellation 220 (FIG. 2B). Using the latter concept, an IQ modulator of FE circuit 140 can be configured to generate communication signal 142 that carries constellation symbols (points) of constellation 230 by (i) generating the I component of signal 142 using constellation 210, (ii) generating the Q component of signal 142 using constellation 220, and (iii) appropriately combining the I and Q components.

A person of ordinary skill in the art will understand that other constellations that differ from the example constellations of FIGS. 2A-2C can also be used in system 100. For example, an m-PAM constellation (where m is an even integer greater than four) can be constructed by expanding constellation 210, e.g., by placing additional equally spaced constellation points on the I axis (see FIG. 2A). An n-PAM constellation (where n is an even integer greater than four) can similarly be constructed by expanding constellation 220, e.g., by placing additional equally spaced constellation points on the Q axis (see FIG. 2B). An IQ modulator of FE circuit 140 can then be configured to generate communication signal 142 that carries constellation symbols of an (n×m)-QAM constellation by (i) generating the I component of signal 142 using the m-PAM constellation, (ii) generating the Q component of signal 142 using the n-PAM constellation, and (iii) appropriately combining the I and Q components.

Figure 9:
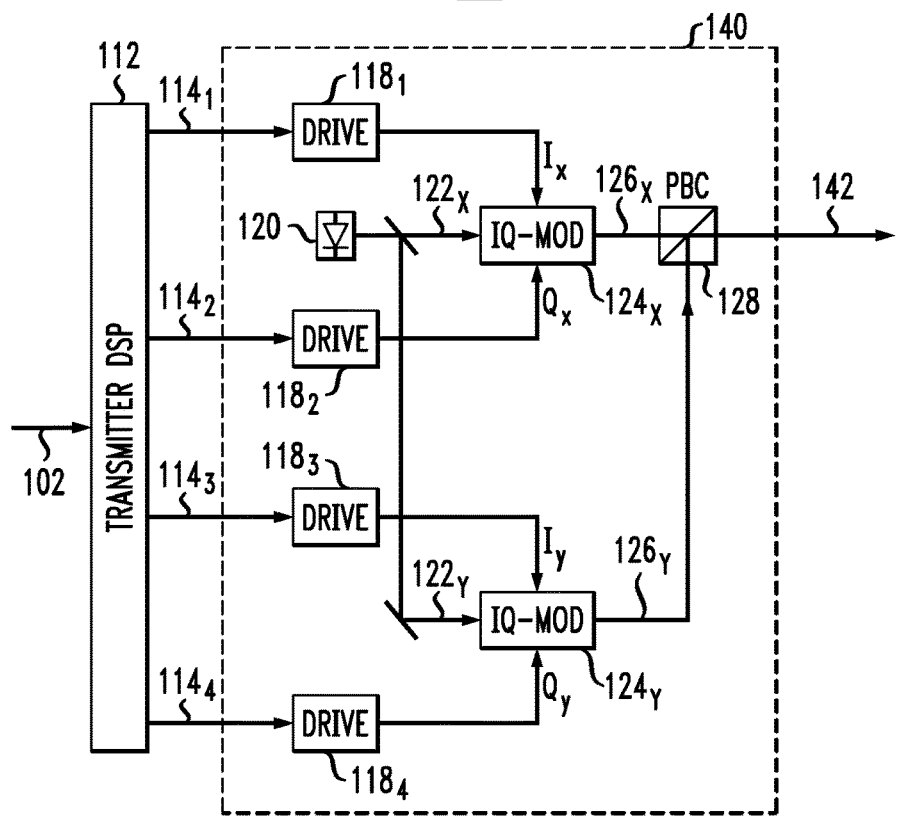
FIG. 9 shows a block diagram of an optical transmitter that can be used in the communication system of FIG. 1 according to an optical-communication embodiment.
Figure 10:
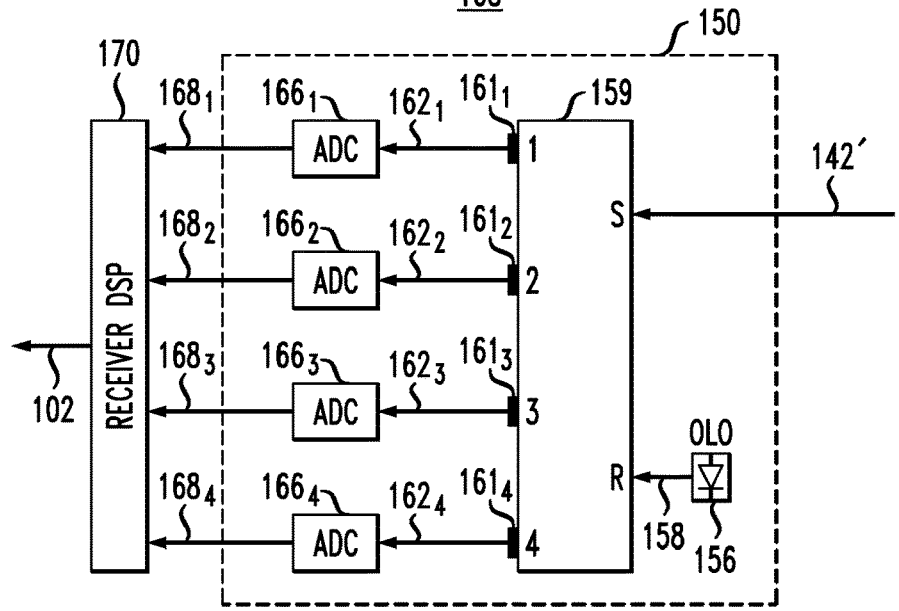
FIG. 10 shows a block diagram of an optical receiver that can be used in the communication system of FIG. 1 according to an optical-communication embodiment.

Communication system 100 can also use other constellations, e.g., which combine phase and amplitude optical modulation on one or both orthogonal polarization modes of an optical signal (also see FIGS. 9-10).

For illustration purposes and without any implied limitation, system 100 is described herein below in reference to an example embodiment that uses a 4-PAM constellation, such as constellation 210 (FIG. 2A) or 220 (FIG. 2B). Based on the provided description, a person of ordinary skill in the art will be able to make and use, without any undue experimentation, alternative embodiments of system 100 in which a PAM or a QAM constellation of a desired size, e.g., constructed in the above-described manner, is used. For an M-PAM constellation, in which M>4, the bits assigned to a constellation point include one sign bit and two or more amplitude bits. For an M-QAM constellation, in which M>4, the bits assigned to a constellation point include two sign bits and three or more amplitude bits.

FIG. 3 shows a block diagram of a shaping encoder 300 that can be used, e.g., to perform PCS, in electronic encoder 110 (FIG. 1) according to an embodiment. In operation, shaping encoder (also sometimes referred to as "distribution matcher" or DM) 300 may convert an input data stream 302 into a corresponding sequence of positive amplitudes 338. The conversion is done block by block, with each block being ultimately converted into a corresponding data frame comprising a set of constellation symbols. Input data stream 302 can be generated, e.g., by demultiplexing the input data stream 102 into sign bits and amplitude bits, with stream 302 being the stream that carries the amplitude bits. Positive amplitudes 338 can be converted into constellation symbols for sequence 138, e.g., by pre-pending thereto the respective sign bits from the stream that carries the sign bits. The resulting data frame is then transmitted over link 106 such that different constellation symbols of the data frame occupy different time slots. For example, a data frame having S constellation symbols may be transmitted using S time slots, wherein each of the constellation symbols is transmitted in a different respective time slot.

Shaping encoder 300 comprises a constellation mapper 336 that operates to (i) parse input data stream 302 into bit-words using the codebooks, e.g., stored in look-up tables (LUTs) $320_1, \ldots, 320_N$, and $320_{N+1}$, (ii) convert each of the bit-words into a corresponding codeword using a selected one of said codebooks, and (iii) output the resulting stream of codewords, thereby generating the amplitude sequence 338. Herein, the number N is a positive integer greater than one (i.e., N>2).

Each of LUTs $320_1, \ldots, 320_N$ stores therein a respective codebook (hereafter Cn, where n=1, 2, . . . , N) containing a respective variable-length signal-shaping code. In an example embodiment, a codebook Cn represents a respective variable-input variable-output (VIVO) signal-shaping code. In some embodiments, some of the codebooks Cn may represent respective variable-input fixed-output (VIFO) signal-shaping codes or respective fixed-input variable-output (FIVO) signal-shaping codes. Together, the N codebooks can provide encoding in a manner that causes different symbols to be used with different probabilities in response to the input data stream 302 that is random or quasi-random.

LUT $320_{N+1}$ typically stores therein a codebook (hereafter U) containing a constant-probability code, e.g., a fixed-input fixed-output (FIFO) code.

A codebook selector 332 operates to connect constellation mapper 336 to a selected one of LUTs $320_1, \ldots, 320_{N+1}$. The state of codebook selector 332 is controlled by a control signal 314 that is generated by a control circuit 312. In an example embodiment, control signal 314 can assume N+1 different values, e.g., 0, 1, . . . , N. For example, when the value of control signal 314 is 0, selector 332 connects constellation mapper 336 to LUT $320_1$ to enable the constellation mapper to read from codebook C1. When the value of control signal 314 is (N-1), selector 332 connects constellation mapper 336 to LUT $320_N$ to enable the constellation mapper to read from codebook CN. When the value of control signal 314 is N, selector 332 connects constellation mapper 336 to LUT $320_{N+1}$ to enable the constellation mapper to read from codebook U, and so on.

Shaping encoder 300 operates as a FIFO encoder despite using variable-length signal-shaping codes, e.g., codebooks C1, . . . , CN. More specifically, shaping encoder 300 operates on a block of input bits of a predetermined fixed length B to transform it into a corresponding set of constellation symbols of a predetermined fixed size S, where B and S are positive integers. The numbers B and S are fixed for each particular embodiment, but can change from embodiment to embodiment. In other words, the numbers B and S are parameters of the overall signal-shaping algorithm used in system 100. For example, changing the values of B and S can change the actual shaping gain and/or the actual information transmission rate achieved during communications.

The FIFO functionality of shaping encoder 110 is enabled by the data processing performed in control circuit 312. More specifically, a variable-length signal-shaping code naturally produces a variable-length output from a fixed-length input. The length of the output depends on the binary contents of the input bit sequence and fluctuates around an average length $L_0$, which is a characteristic of the code. The number S can be selected such that S is greater than any of the lengths $L_0$ of the codebooks C1, . . . , CN, but is not too large in the sense that some input bit sequences of the length B can still cause the resulting length L of the corresponding coded output to be greater than S. This condition is hereafter referred to as the "output overflow." The data processing performed in control circuit 312 is designed to predict a possible output overflow for each particular block of input bits that is being encoded by shaping encoder 300 and switch constellation mapper 336 from the use of the variable-length signal-shaping codes of codebooks C1, . . . , CN to the use of the FIFO signal-shaping code of codebook U at an appropriate point within the input block such that the output overflow can be avoided.

On the other hand, for some blocks of input bits, the length L of the corresponding C1-CN coded output can be smaller than S. This condition is hereafter referred to as the "output underflow." In this situation, control circuit 312 does not switch constellation mapper 336 from the use of codebooks C1-CN to the use of codebook U. Instead, constellation mapper 336 appends (S−L) fixed (e.g., dummy) amplitude values, after the encoding of the whole input block is completed, i.e., to still provide output blocks of symbols of constant length S. A person of ordinary skill in the art will understand that the appended amplitude values do not carry any useful information.

In operation, shaping encoder 300 can generate S output amplitudes for any block of B input bits by (i) switching constellation mapper 336 from the use of the variable-length signal-shaping codes of codebooks C1, . . . , CN to the use of the FIFO code of codebook U in case of a predicted output overflow and (ii) appending arbitrary fixed amplitude values in case of the output underflow.

FIGS. 4A-4C show three example codebooks that can be used in shaping encoder 300 according to an embodiment. More specifically, FIG. 4A shows a C1 codebook 410.

FIG. 4B shows a C2 codebook 420. FIG. 4C shows a U codebook 430. Codebooks 410, 420, and 430 rely on the 2-ary amplitude-shift-keying (2-ASK) constellation to generate two possible amplitude values, i.e., "1" and "3". A person of ordinary skill in the art will understand that the 2-ASK constellation can be viewed, e.g., as the positive half of the 4-PAM constellation 210 (FIG. 2A).

In an example embodiment, codebooks 410, 420, and 430 can be used to implement an embodiment of shaping encoder 300 corresponding to N=2. The above-cited U.S. Patent Application Publication No. 2018/0083716 discloses additional example codebooks and a method of generating codebooks Cn that have certain desired characteristics. In light of the present disclosure, a person of ordinary skill in the art will understand how to use those additional example codebooks and/or the disclosed method of generating codebooks Cn to implement other embodiments of shaping encoder 300, e.g., corresponding to other values of N (e.g., for N>2).

Codebook 410 achieves a DM rate $\beta_1 \approx 0.36$ asymptotically with an increase of block size B. Herein, the DM rate is defined as the ratio of the number of input bits to the number of output symbols generated by the shaping code. The shortest bit-word in codebook 410 has one bit, i.e., $b_{min}=1$. The longest codeword in codebook 410 has seven symbols (amplitudes), i.e., $s_{max}=7$.

Codebook 420 achieves a DM rate $\beta_2 \approx 0.6$ asymptotically with an increase of block size B. Note that $\beta_2 > \beta_1$. The shortest bit-word in codebook 420 has one bit, i.e., $b_{min}=1$. The longest codeword in codebook 420 has four symbols (amplitudes), i.e., $s_{max}=4$.

Codebook 430 has a fixed rate $\beta_U=1$, i.e., produces one output amplitude for each input bit, regardless of the block size B.

A person of ordinary skill in the art will understand that the asymptotic behavior of codebooks 410 and 420 means that, for relatively small values of B, the actually achieved DM rates may deviate from the above-indicated values of $\beta_1$ and $\beta_2$ by a larger margin than for relatively large values of B. As used herein, the term "relatively small" should be interpreted as referring to the input block sizes B that result in fewer than approximately 500 output amplitudes.

To illustrate improvements in the energy efficiency that can be realized using various embodiments disclosed herein, let us suppose first that only a single codebook Cn (e.g., C1 codebook 410, FIG. 4A) can be used in shaping encoder 300, with the other relevant LUTs 320 (e.g., $320_2$-$320_N$) being disconnected, disabled, or not loaded with any additional codebooks Cn. Then, shaping encoder 300 so configured may cause the following energy inefficiencies.

When the binary contents of the input block 302 are such that the single codebook Cn causes many relatively long codewords to be generated for the corresponding output frame 338 at the beginning of the input block, then control circuit 312 will switch shaping encoder 300 to the use of the U codebook (e.g., U codebook 430, FIG. 4C) relatively early in the frame, thereby causing a relatively large portion of the output frame to carry unshaped amplitudes. For example, for C1 codebook 410, such an event may occur when the initial portion of the input block 302 is parsed into bit-words in which the bit-words "0", "100", and "101" are relatively prevalent. A person of ordinary skill in the art will understand that a significant loss of energy efficiency can occur when the implementation of PCS transmits many unshaped amplitudes (symbols) instead of probabilistically shaped amplitudes (symbols).

On the other hand, when the binary contents of the input block 302 are such that the single codebook Cn causes many short codewords to be generated for the corresponding output frame 338 at the beginning of the input block, then shaping encoder 300 will have to append a relatively large number of dummy amplitudes at the end of the frame to fill up the unused vacancies therein, thereby causing a relatively large portion of the output frame not to carry any useful information. For example, for C1 codebook 410, such an event may occur when the initial portion of the input block 302 is parsed into bit-words in which the bit-words "111111" and "111110" are relatively prevalent. A person of ordinary skill in the art will understand that a significant loss of energy efficiency can occur when dummy amplitudes are transmitted instead of or in addition to probabilistically shaped amplitudes.

Shaping encoder 300 is designed to prevent or reduce the above-indicated energy inefficiencies by using multiple codebooks Cn, rather than a single codebook, e.g., C1. An example data processing method 500 that can be implemented for this purpose in shaping encoder 300 is described in reference to FIG. 5. In an example embodiment, the N codebooks Cn that are loaded into LUTs $320_1$-$320_N$ for implementing method 500 have the asymptotic DM rates $\beta_n$ that satisfy the following inequality:

$$\beta_1 < \beta_2 < \ldots < \beta_N \qquad (1)$$

For example, in the embodiment corresponding to FIGS. 4A-4C, $\beta_1 < \beta_2$ and N=2.

In some embodiments, the various codebooks C1-CN may be defined such that the maximum-length codeword of CK is shorter than the maximum-length codeword of CL if K<L with 1≤L, K≤N. In some embodiments according to FIG. 3, the selector controller 312 may be configured to change the selected codebook to CK, with K≥L, in response to determining that one or more remaining bit-words of an input block, which is being encoded, may not be encodable into the output block of symbols if another input bit-word of the input block is encoded according to the codebook C(L−1). For example, since the output block has fixed symbol length, the number of remaining symbol slots therein may not suffice for encoding another input bit-word of C(L−1). Indeed, the remaining symbol slots for input bit-words typically must be, at least, sufficient to encode the remaining bit-words of the input block via the codebook U. In some embodiments, the selector controller 312 makes the decision to select a different codebook C1-CN, U for the next bit-word based only on bit-words previously encoded into symbols, e.g., to simplify the decoding of the received symbol stream in the corresponding data receiver 108 (FIG. 1).

Figure 5:
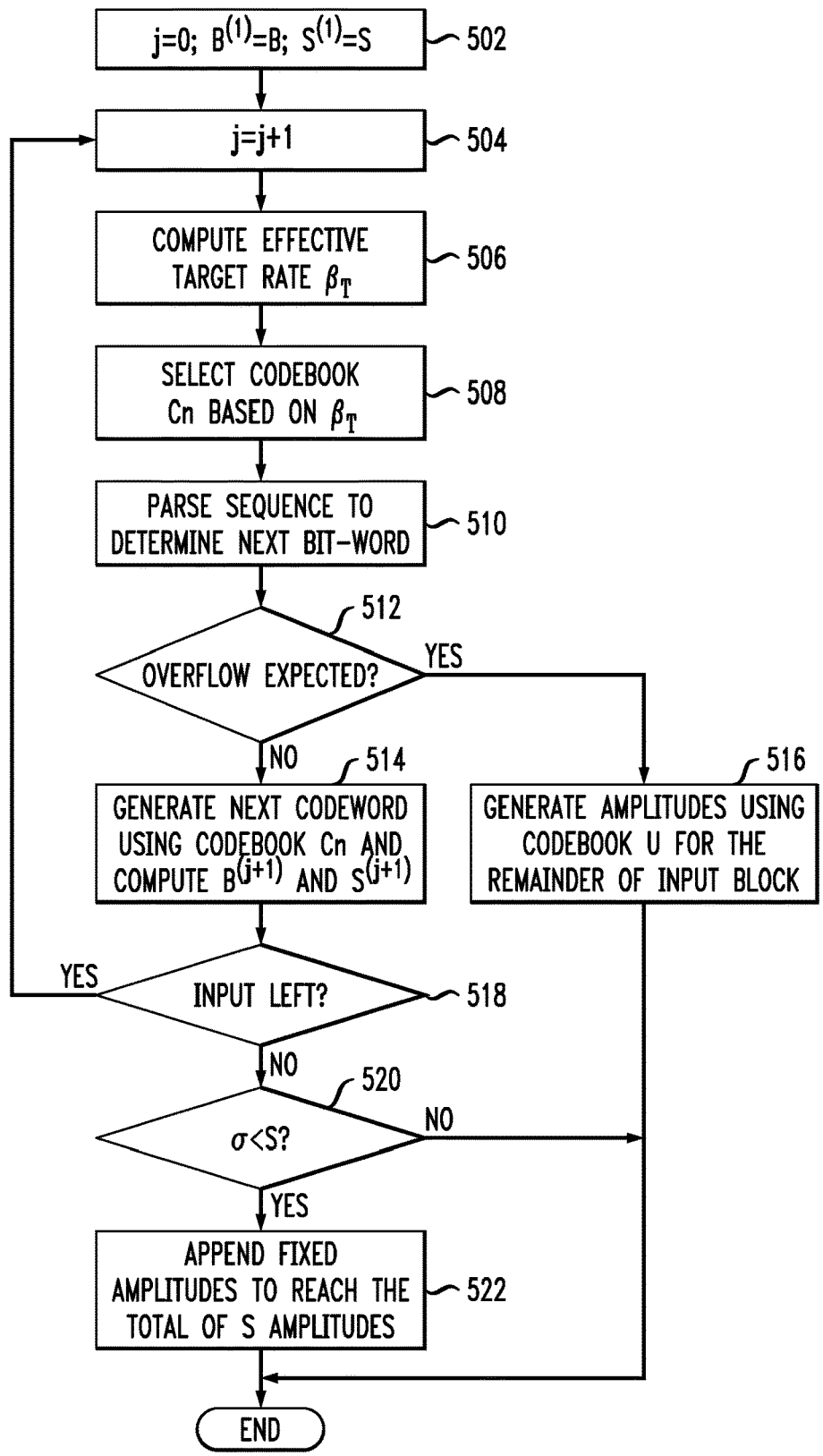
FIG. 5 shows a flowchart of a data processing method that can be used in the shaping encoder of FIG. 3 according to an embodiment.

FIG. 5 shows a flowchart of an example specific data processing method 500 that can be used in shaping encoder 300 (FIG. 3) according to an embodiment. More specifically, method 500 can be used to program shaping encoder 300 to convert an input block of B input bits into a set of S 2-ASK amplitudes. Selector controller 312 may also be programmed in accordance with method 500.

Method 500 is initialized at step 502, where certain parameters are set to their initial values. For example, the loop index j is set to j=0. The effective input block size value $B^{(1)}$ is set to $B^{(1)}=B$. The effective output frame size value $S^{(1)}$ is set to $S^{(1)}=S$.

At step 504, the loop index j is incremented by one.

At step 506, control circuit 312 computes the effective target rate $\beta_T$ using Eq. (2):

$$\beta_T = \frac{B^{(j)}}{S^{(j)}} \qquad (2)$$

At step 508, control circuit 312 selects codebook Cn from codebooks C1, ..., CN based on the effective target rate $\beta_T$ computed at step 504. In an example embodiment, said selection can be made, e.g., using the selection criterion expressed by Eq. (3):

$$n = \text{argmin}_{r \in \{1, \ldots, N\}} |\beta_T - \beta_i| \qquad (3)$$

This criterion causes control circuit 312 to select the codebook Cn whose DM rate $\beta_n$ most closely matches the effective target rate $\beta_T$. In alternative embodiments, other suitable selection criteria may similarly be used to select one of codebooks C1, ..., CN.

In an example embodiment, different codebooks Cn may be selected at different instances of step 508 when the processing loop 504-518 is repeated. In general, codebooks Cn having progressively higher DM rates $\beta_n$ tend to be selected as the number of unprocessed bits of input block 302 gets progressively reduced (also see Eq. (1)).

After the codebook selection is made, control circuit 312 generates control signal 314 having a value that causes selector 332 to connect constellation mapper 336 to LUT $320_n$, in which the selected codebook Cn is stored.

At step 510, the unprocessed portion of input block 302 is parsed to determine a next bit-word to be encoded.

As used herein the terms "parse" and "parsing" should be interpreted to mean reading the unstructured (e.g., indefinite length) input bit sequence such that it can be divided into (presented as a sequence of) bit-words of definite lengths, e.g., in accordance with some predefined list and/or set of rules, which can be determined in the subsequent step 512.

At step 512, control circuit 312 checks whether or not an output overflow is expected if the bit-word is encoded by the selected codebook Cn. The quantitative condition used at step 512 to predict an output overflow may depend on the codebooks C1, ..., CN in general, and on the codebook Cn in particular, and, e.g., on the length of the unprocessed portions of the input block of bits and/or of the output frame.

In an example embodiment, the criterion expressed by Eq. (4) can be used for the overflow determination:

$$\left\lceil \frac{B^{(j)} - b_{min}}{\beta_U} \right\rceil \geq S^{(j)} - s_{max} \qquad (4)$$

where $\beta_U$ is the DM rate of the codebook U. In some implementations, the values of $b_{min}$ and $s_{max}$ used in Eq. (4) can be the lengths of the shortest bit-word and longest codeword, respectively, in the codebook Cn selected at step 508. In some other implementations, the values of $b_{min}$ and $s_{max}$ used in Eq. (4) can be the lengths of the shortest bit-word and longest codeword, respectively, in the entire set of codebooks C1, ..., CN. A person of ordinary skill in the art will understand that Eq. (4) is a mathematical expression representing the worst-case scenario, according to which the binary contents of the input block 302 are assumed to be such that the input block will be parsed into a sequence of smallest bit-words to generate a sequence of longest codewords.

If the inequality given in Eq. (4) is not satisfied, then an output overflow is not expected. In this case, the processing of method 500 is directed to step 514. On the other hand, if the inequality given in Eq. (4) is satisfied, then an output overflow may occur if step 514 is performed. In this case, the processing of method 500 is directed to step 516.

Alternative overflow criteria that are not based on the worst-case scenario may be constructed using some of the overflow considerations and criteria described in the above-cited U.S. Patent Application Publication No. 2018/0083716.

At step 514, constellation mapper 336 uses the codebook Cn to convert the bit-word determined at step 510 into the corresponding codeword for the amplitude sequence 338. To determine the next bit-word, constellation mapper 336 and/or control circuit 312 may compare several initial bits of the unprocessed portion of input block 302 with the bit-words listed in the bit-word column of the codebook Cn (see, e.g., FIGS. 4A and 4B) until a unique match is found. From the found match, it can be determined (i) how many bits this bit-word has and (ii) how many amplitudes the corresponding codeword has. These numbers are hereafter referred to as $b_j$ and $s_j$, respectively. Control circuit 312 then operates to compute the effective input block size value $B^{(j+1)}$ and the effective output frame size value $S^{(j+1)}$ in accordance with Eqs. (5) and (6):

$$B^{(j+1)} = B^{(j)} - b_j \qquad (5)$$

$$S^{(j+1)} = S^{(j)} - s_j \qquad (6)$$

At step 516, control circuit 312 changes control signal 314 to connect constellation mapper 336 to LUT $320_{N+1}$, thereby causing the constellation mapper to use the codebook U stored therein. Constellation mapper 336 then proceeds to use the codebook U until the remainder of the input block 302 is converted into amplitudes.

At step 518, it is determined whether or not the input block 302 has been processed in its entirety. If all bits of the block 302 have been processed, then the processing of method 500 is directed to step 520. Otherwise, the processing of method 500 is directed back to step 504.

At step 520, the sum a of the lengths $s_j$ of the codewords generated so far is compared with S. If a is smaller than S, then an output underflow has occurred and the processing of method 500 is directed to step 522. Otherwise, the processing of method 500 is terminated.

At step 522, a set of (S−σ) fixed amplitudes (e.g., all "ones") is appended to the σ previously generated amplitudes to generate a total of S amplitudes. The processing of method 500 is then terminated.

Figure 6:
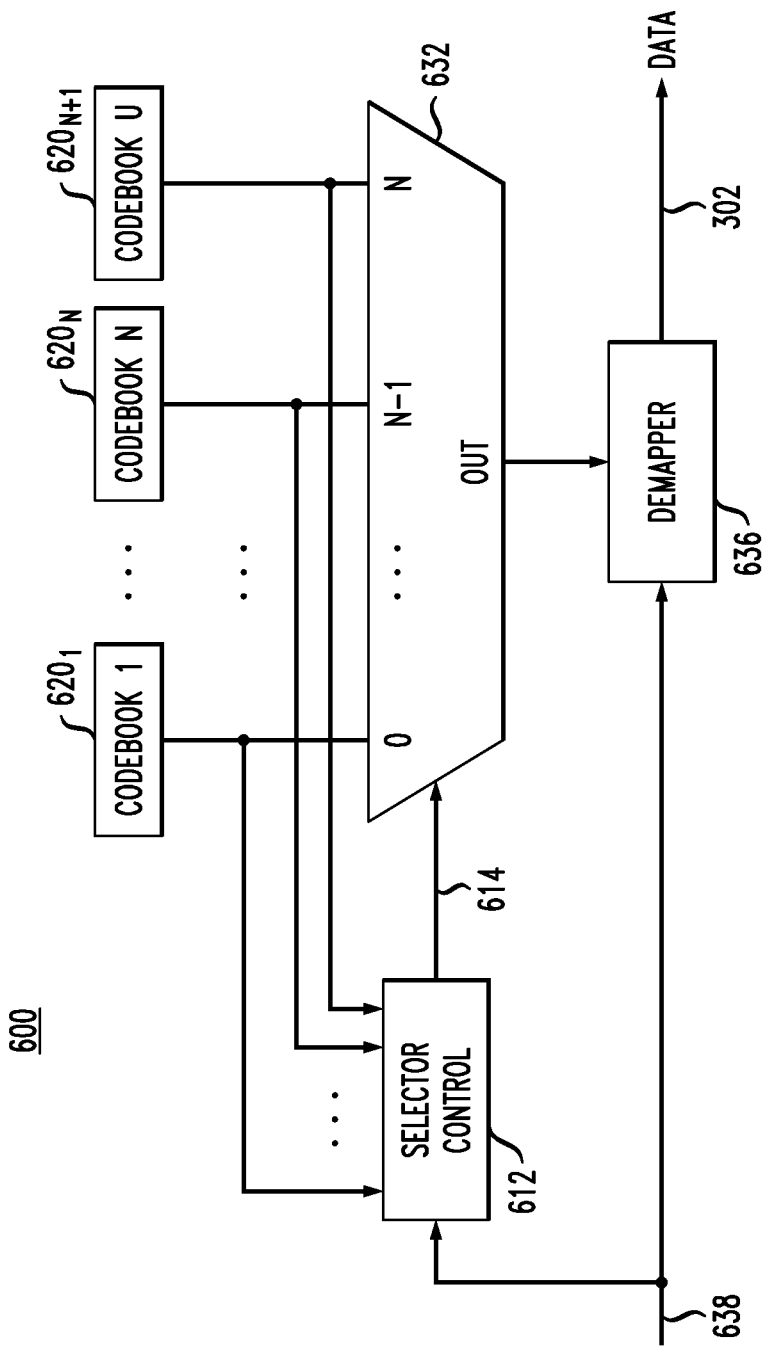
FIG. 6 shows a block diagram of a shaping decoder that can be used in a data receiver of the communication system of FIG. 1 according to an embodiment.

FIG. 6 shows a block diagram of a shaping decoder 600 that can be used in electronic decoder 160 (FIG. 1) according to an embodiment. Shaping decoder (also sometimes referred to as "distribution matcher" or DM) 600 is compatible with and complementary to shaping encoder 300 (FIG. 3). In operation, shaping decoder 600 processes a digital input stream 638 to recover data stream 302 (also see FIG. 3). Digital input stream 638 can be generated, e.g., by demultiplexing (parsing) the digital input stream 152 to generate the corresponding streams of sign bits and measured positive amplitude values, with stream 638 being the stream that carries said amplitude values.

Shaping decoder 600 comprises a constellation demapper 636 that operates to (i) parse digital input stream 638 into codewords using the codebooks stored in LUTs $620_1, \ldots, 620_N$, and $620_{N+1}$, (ii) convert each of the codewords into a corresponding bit-word using a selected one of said codebooks, and (iii) output the resulting stream of bit-words, thereby recovering the data stream 302. In an example embodiment, the codebooks stored in LUTs $620_1, \ldots, 620_N$, and $620_{N+1}$ are the same codebooks as those stored in LUTs $320_1, \ldots, 320_N$, and $320_{N+1}$, respectively, of shaping encoder 300 (FIG. 3). Shaping decoder 600 is a FIFO decoder that is configured to process a block of S measured amplitudes of stream 638 to generate B output bits for the recovered stream 302.

A codebook selector 632 operates to connect constellation demapper 636 to a selected one of LUTs $620_1, \ldots, 620_{N+1}$. The state of codebook selector 632 is controlled by a control signal 614 that is generated by a control circuit 612. In an example embodiment, control signal 614 can assume N+1 different values, e.g., 0, 1, ..., N. For example, when the value of control signal 614 is 0, selector 632 connects constellation demapper 636 to LUT $620_1$ to enable the constellation mapper to read from codebook C1. When the value of control signal 614 is (N−1), selector 632 connects constellation demapper 636 to LUT $620_N$ to enable the constellation mapper to read from codebook CN. When the value of control signal 614 is N, selector 632 connects constellation demapper 636 to LUT $620_{N+1}$ to enable the constellation mapper to read from codebook U, and so on.

Figure 7:
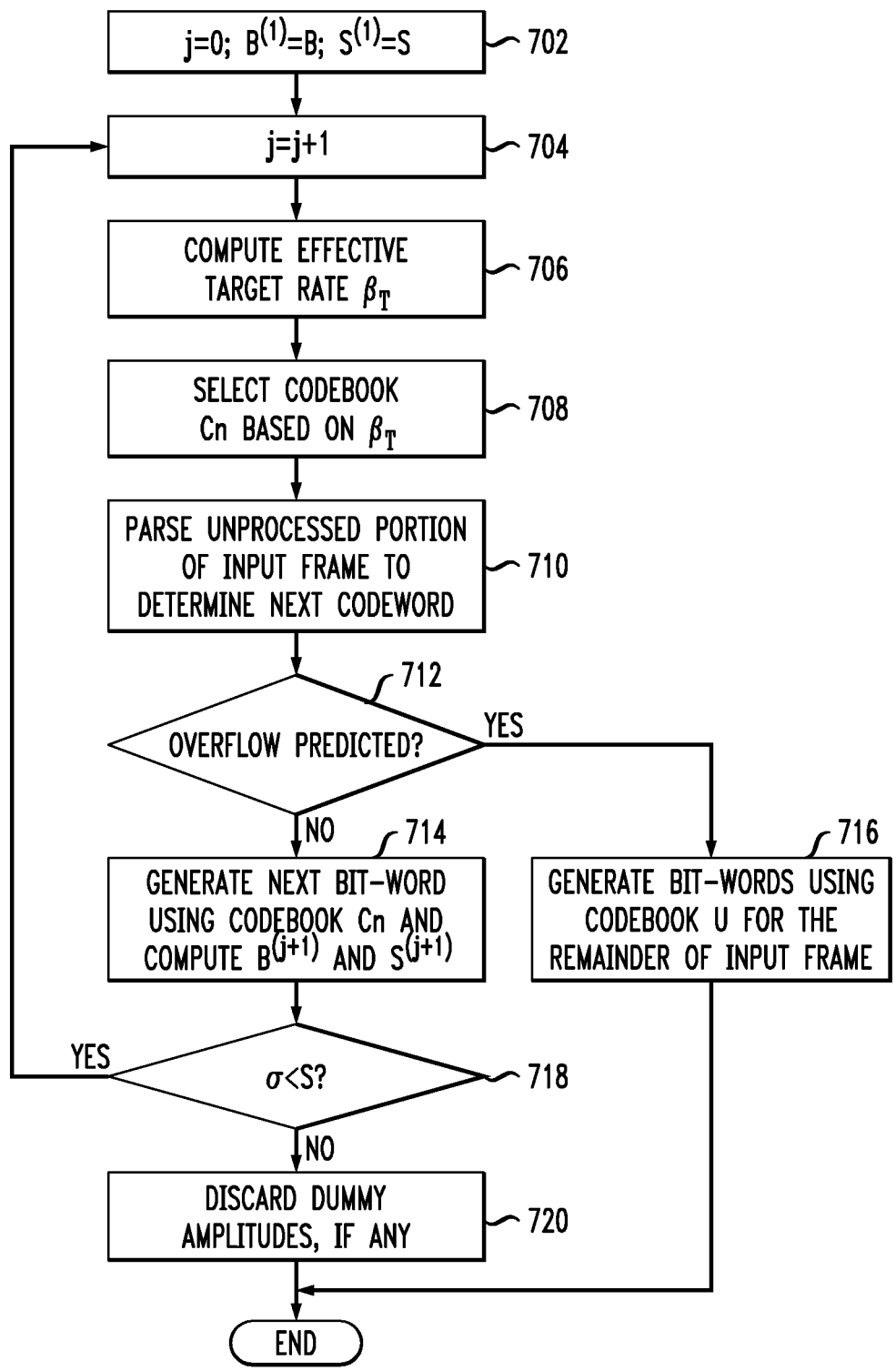
FIG. 7 shows a flowchart of a signal processing method that can be used in the shaping decoder of FIG. 6 according to an embodiment.

FIG. 7 shows a flowchart of a signal processing method 700 that can be used in shaping decoder 600 (FIG. 6) according to an embodiment. More specifically, method 700 can be used to program shaping decoder 600 to convert an input frame of S measured amplitudes into B output bits.

Method 700 is initialized at step 702, where certain parameters are set to their initial values. For example, the loop index j is set to j=0. The effective input frame size value $S^{(1)}$ is set to $S^{(1)}=S$. The effective output block size value $B^{(1)}$ is set to $B^{(1)}=B$.

At step 704, the loop index j is incremented by one.

At step 706, control circuit 612 computes the effective target rate $\beta_T$ using Eq. (2).

At step 708, control circuit 712 selects codebook Cn from codebooks C1, ..., CN based on the effective target rate $\beta_T$ computed at step 704 using the same selection criteria as those used at step 508 of method 500 (FIG. 5). For example, said selection can be made using the selection criterion expressed by Eq. (3).

After the codebook selection is made, control circuit 612 generates control signal 614 having a value that causes selector 632 to connect constellation demapper 636 to LUT $620_n$, in which the selected codebook Cn is stored.

At step 710, the unprocessed portion of input frame 638 is parsed to determine a next codeword to be decoded. The parsing is performed in accordance with the codebook Cn selected at step 708. To determine the next bit-word, constellation demapper 636 and/or control circuit 612 may compare several initial amplitudes of the unprocessed portion of input frame 638 with the codewords listed in the codeword column of the codebook Cn (see, e.g., FIGS. 4A and 4B) until a unique match is found. From the found match, it can be determined (i) how many amplitudes this codeword has and (ii) how many bits the corresponding bit-word has. These numbers are used to set the values of $s_j$ and $b_j$, respectively.

At step 712, control circuit 612 checks whether or not an output overflow was predicted at this point when frame 638 was generated by shaping encoder 300. The quantitative condition used at step 712 is the same as that used at step 512 of method 500 (FIG. 5). For example, Eq. (4) can be used for this purpose in some embodiments as explained above in reference to FIG. 5.

If it is determined at step 712 that the overflow was not predicted at this point, then the processing of method 700 is directed to step 714. Otherwise, the processing of method 700 is directed to step 716.

At step 714, constellation demapper 636 uses the codebook Cn to convert the codeword determined at step 710 into the corresponding bit-word for the recovered stream 302. Control circuit 612 then operates to compute the effective input block size value $B^{(j+1)}$ and the effective frame size value $S^{(j+1)}$ in accordance with Eqs. (5) and (6).

At step 716, control circuit 712 changes control signal 714 to connect constellation demapper 636 to LUT $620_{N+1}$, thereby causing the constellation demapper to use the codebook U stored therein. Constellation demapper 636 then proceeds to use the codebook U until the remainder of the input frame 638 is converted into bit-words.

At step 718, the sum a of the lengths $s_j$ of the codewords decoded so far is compared with S. If a is smaller than S, then the processing of method 700 is directed back to step 704. Otherwise, the processing of method 700 is directed to step 720.

At step 720, the remaining unprocessed portion (if any) of the input frame 638 is discarded. A person of ordinary skill in the art will understand that the discarded amplitudes do not carry any useful information because they were appended at shaping encoder 300 due to the output underflow therein. The processing of method 700 is then terminated.

Figure 8:
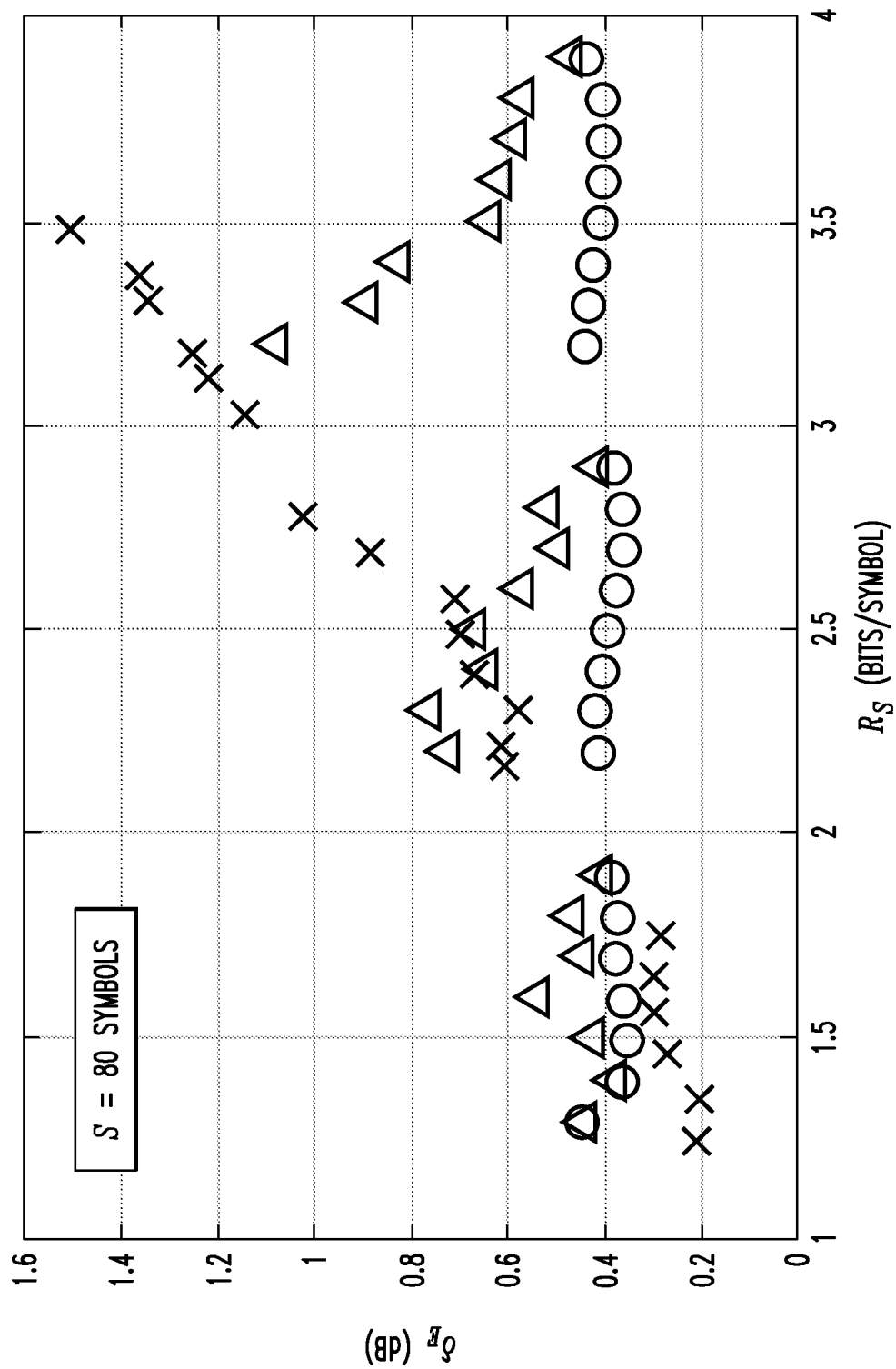
FIG. 8 graphically illustrates improvements in the energy efficiency that can be realized using example embodiments of the communication system of FIG. 1.

FIG. 8 graphically illustrates improvements in the energy efficiency that can be realized using example embodiments.

More specifically, FIG. 8 shows results of numerical simulations corresponding to the frame size S=80. In the simulations, an M-PAM constellation that is symmetric around zero was created by multiplying FEC-encoded sign bits (+) with the shaped positive-valued unipolar ASK symbols (amplitudes), thereby implementing the shaping rate $R_S$ expressed by Eq. (7):

$$R_S = 1 + \beta_A \quad (7)$$

where $\beta_A = B/S$ denotes the actual code rate realized by the corresponding shaping encoder, e.g., shaping encoder 300. The value of $R_S$ is plotted on the abscissa of the graph shown in FIG. 8. The ordinate of the graph shown in FIG. 8 plots the values of $\delta_E$ defined by Eq. (8):

$$\delta_E = \frac{E_S}{E_{MB}} \quad (8)$$

where $E_S$ denotes the average symbol energy of the DM-encoded output frame; and $E_{MB}$ is the average energy of the transmitted symbols whose probability follows a Maxwell-Boltzmann distribution and whose entropy rate is equal to $R_S$. A person of ordinary skill in the art will understand that the value of $\delta_E=0$ dB represents the theoretical limit. Thus, the relatively better energy efficiency corresponds to smaller values of $\delta_E$ in dB.

For numerical evaluation of the performance of shaping encoder 300, 23 codebooks Cn were used. Among those, seven codebooks (with $R_S$=1.3, 1.4, . . . , 1.9) used a 4-PAM constellation; eight codebooks (with $R_S$=2.2, 2.3, . . . , 2.9) used an 8-PAM constellation; and eight codebooks (with $R_S$=3.2, 3.3, . . . , 3.9) used a 16-PAM constellation. The codebook sizes were 32, 64, and 64 entries long for 4-, 8-, and 16-PAM, respectively.

In FIG. 8, the "x" markers show the estimated performance of the constant-composition distribution-matching (CCDM) technique described, e.g., in P. Schulte et al., "Constant Composition Distribution Matching," IEEE Trans. Inform. Theory, 62(1), pp. 430-434, 2016, which is incorporated herein in its entirety. The triangles show the estimated performance of the prefix-free-code distribution-matching (PCDM) technique described, e.g., in the above-cited U.S. Patent Application Publication No. 2018/0083716. The triangles show the estimated performance of system 100 that uses the above-indicated embodiment of shaping encoder 300.

As can be seen in FIG. 8, the use of shaping encoder 300 can provide noticeable improvements in the energy efficiency with respect to the other two techniques. The improvements can be attributed to the ability of shaping encoder 300 to adaptively change the shaping code, e.g., using steps 506-508 of method 500 (FIG. 5). Remarkably, the $\delta_E$ value of ~0.4 dB can be achieved across a wide range of the shaping rate $R_S$ with a small frame size (S=80 PAM symbols) and small codebook sizes ($\leq$64).

FIG. 9 shows a block diagram of an optical transmitter 104 that can be used in system 100 (FIG. 1) according to an embodiment.

In operation, transmitter 104 receives input stream 102 of payload data and applies it to a digital signal processor (DSP) 112, which implements, inter alia, the electronic encoder 110 (FIG. 1). DSP 112 processes input data stream 102 to generate digital signals $114_1$-$114_4$. In an example embodiment, DSP 112 may perform, one or more of the following: (i) de-multiplex input stream 102 into two sub-streams, each intended for optical transmission using a respective one of orthogonal (e.g., X and Y) polarizations of optical output signal 142; (ii) encode each of the sub-streams using a suitable code, e.g., as outlined above; and (iii) convert each of the two resulting sub-streams into a corresponding sequence of constellation symbols. In each signaling interval (also referred to as a symbol period or time slot), signals $114_1$ and $114_2$ carry digital values that represent the in-phase (I) component and quadrature (Q) component, respectively, of a corresponding constellation symbol intended for transmission using a first (e.g., X) polarization of light. Signals $114_3$ and $114_4$ similarly carry digital values that represent the I and Q components, respectively, of the corresponding constellation symbol intended for transmission using a second (e.g., Y) polarization of light.

In this embodiment, transmitter FE circuit 140 is an electrical-to-optical (E/O) converter configured to transform digital signals $114_1$-$114_4$ into a corresponding modulated optical output signal 142. More specifically, drive circuits $118_k$ and $118_2$ transform digital signals $114_1$ and $114_2$, as known in the art, into electrical analog drive signals $I_X$ and $Q_X$, respectively. Drive signals $I_X$ and $Q_X$ are then used, in a conventional manner, to drive an I-Q modulator $124_X$. In response to drive signals $I_X$ and $Q_X$, I-Q modulator $124_X$ operates to modulate an X-polarized beam $122_X$ of light supplied by a laser source 120 as indicated in FIG. 9, thereby generating a modulated optical signal $126_X$.

Drive circuits $118_3$ and $118_4$ similarly transform digital signals $114_3$ and $114_4$ into electrical analog drive signals $I_Y$ and $Q_Y$, respectively. In response to drive signals $I_Y$ and $Q_Y$, an I-Q modulator $124_Y$ operates to modulate a Y-polarized beam $122_Y$ of light supplied by laser source 120 as indicated in FIG. 9, thereby generating a modulated optical signal $126_Y$. A polarization beam combiner 128 operates to combine modulated optical signals $126_X$ and $126_Y$, thereby generating optical output signal 142 (also see FIG. 1).

FIG. 10 shows a block diagram of an optical receiver 108 that can be used in system 100 (FIG. 1) according to an embodiment.

In this embodiment, receiver FE circuit 150 is an optical-to-electrical (O/E) converter comprising an optical hybrid 159, light detectors $161_1$-$161_4$, analog-to-digital converters (ADCs) $166_1$-$166_4$, and an optical local-oscillator (OLO) source 156. Optical hybrid 159 has (i) two input ports labeled S and R and (ii) four output ports labeled 1 through 4. Input port S receives optical signal 142' (also see FIG. 1). Input port R receives an OLO signal 158 generated by OLO source 156. OLO signal 158 has an optical-carrier wavelength (frequency) that is sufficiently close to that of signal 142' to enable coherent (e.g., intradyne) detection of the latter signal. OLO signal 158 can be generated, e.g., using a relatively stable laser whose output wavelength (frequency) is approximately the same as the carrier wavelength (frequency) of optical signal 142.

In an example embodiment, optical hybrid 159 operates to mix input signal 142' and OLO signal 158 to generate different mixed (e.g., by interference) optical signals (not explicitly shown in FIG. 10). Light detectors $161_1$-$161_4$ then convert the mixed optical signals into four electrical signals $162_1$-$162_4$ that are indicative of complex values corresponding to two orthogonal-polarization components of signal 142'. For example, electrical signals $162_1$ and $162_2$ may be an analog I signal and an analog Q signal, respectively, corresponding to a first (e.g., horizontal, h) polarization component of signal 142'. Electrical signals $162_3$ and $162_4$ may similarly be an analog I signal and an analog Q signal, respectively, corresponding to a second (e.g., vertical, v) polarization component of signal 142'. Note that the orientation of the h and v polarization axes at receiver 108 may not coincide with the orientation of the X and Y polarization axes at transmitter 104.

Each of electrical signals $162_1$-$162_4$ is converted into digital form in a corresponding one of ADCs $166_1$-$166_4$. Optionally, each of electrical signals $162_1$-$162_4$ may be amplified in a corresponding electrical amplifier (not explicitly shown) prior to the resulting signal being converted into digital form. Digital signals $168_1$-$168_4$ produced by ADCs $166_1$-$166_4$ are then processed by a DSP 170, which implements, inter alia, electronic decoder 160 (see FIG. 1).

In an example embodiment, in addition to the above-described decoding, DSP 170 may perform one or more of the following: (i) signal processing directed at dispersion compensation; (ii) signal processing directed at compensation of nonlinear distortions; and (iii) electronic polarization de-multiplexing.

According to an example embodiment disclosed above, e.g., in the summary section and/or in reference to any one or any combination of some or all of FIGS. 1-10, provided is an apparatus comprising: a shaping encoder (e.g., 300, FIG. 3) comprising a selector (e.g., 312/332, FIG. 3) and a constellation mapper (e.g., 336, FIG. 3), the constellation mapper being capable of generating a frame of symbols of a constellation in response to receipt of an input block of bits, the selector being capable of causing the constellation mapper to generate the frame by selectively mapping bits of the input block into symbols of the frame using a plurality of shaping codes (e.g., C1, . . . , CN, FIG. 3), each shaping code mapping bits into symbols of the constellation such that some symbols of higher energy have a lower probability of being generated by the mapping than other symbols of lower energy; and a data transmitter (e.g., 104, FIG. 1) coupled to the shaping encoder to transmit a modulated signal carrying the frame.

In some embodiments of the above apparatus, the selector is configured (e.g., using 312/314, FIG. 3) to cause the constellation mapper to generate different segments of the frame from the mappings of different ones of the shaping codes.

In some embodiments of any of the above apparatus, said different ones of the shaping codes have different respective code rates (e.g., as in Eq. (1)).

In some embodiments of any of the above apparatus, at least one of the shaping codes (e.g., 410, FIG. 4A) is a variable-input variable-output shaping code; and wherein the input block of bits has a fixed number of bits, and the frame has a fixed number of constellation symbols.

In some embodiments of any of the above apparatus, at least some of the shaping codes have different respective code rates (e.g., as in Eq. (1)).

In some embodiments of any of the above apparatus, the selector is configured to select (e.g., at 508, FIG. 5) a shaping code of the plurality for use by the constellation mapper based on a size of unprocessed portion of the input block of bits and a number of unfilled vacancies for symbols of the constellation in the frame (e.g., using Eqs. (2)-(3)).

In some embodiments of any of the above apparatus, the selector is capable of causing the constellation mapper to generate the frame according to the shaping codes and according to a constant-probability code (e.g., U, FIG. 3), the constant-probability code mapping bits into said some symbols and said other symbols with equal probability.

In some embodiments of any of the above apparatus, the constant-probability code is a fixed-input fixed-output code (e.g., 430, FIG. 4C).

In some embodiments of any of the above apparatus, the apparatus further comprises a nonvolatile memory having stored therein a plurality of look-up tables (e.g., $320_1$-$320_N$, FIG. 3), each of said look-up tables representing a respective one of the shaping codes.

In some embodiments of any of the above apparatus, the data transmitter comprises a data driver (e.g., 112/118, FIG. 9) and an optical modulator (e.g., 124, FIG. 9) configured to generate an optical output signal under control of the data driver, the optical output signal being the modulated signal carrying the frame, the data driver including the shaping encoder.

In some embodiments of any of the above apparatus, the apparatus further comprises a data receiver (e.g., 108, FIG. 1) coupled to the data transmitter to receive the modulated signal and to recover therefrom the frame of constellation symbols; and a shaping decoder (e.g., 600, FIG. 6) configured to use the plurality of shaping codes to recover the input block of bits from the frame of constellation symbols recovered by the data receiver.

In some embodiments of any of the above apparatus, the data transmitter is configured to transmit the modulated signal such that at least some constellation symbols of the frame occupy different respective time slots.

In some embodiments of any of the above apparatus, the constellation includes one or more constellation symbols having a first transmit energy and one or more constellation symbols having a second transmit energy that is greater than the first transmit energy; and wherein the shaping codes is configured to cause the one or more constellation symbols of the second transmit energy to occur less frequently than the one or more constellation symbols of the first transmit energy.

According to another example embodiment disclosed above, e.g., in the summary section and/or in reference to any one or any combination of some or all of FIGS. 1-10, provided is an apparatus comprising: a data receiver (e.g., 108, FIG. 1) configured to generate a sequence of digital samples in response to receipt of a modulated signal carrying a frame of symbols of a constellation, the digital samples representing measurements of the symbols; and a shaping decoder (e.g., 600, FIG. 6) that comprises a constellation demapper (e.g., 636, FIG. 6) and a selector (e.g., 612/632, FIG. 6), the selector being configured to cause the constellation demapper to selectively use a plurality of shaping codes (e.g., C1, . . . , CN, FIG. 6) to generate an output block of bits in response to the sequence of digital samples; and wherein each of the shaping codes maps bits into symbols of the constellation such that some symbols of higher energy have a lower probability of being generated by the mapping than other symbols of lower energy.

In some embodiments of the above apparatus, the selector is configured (e.g., using 612/614, FIG. 6) to cause the constellation demapper to demap different segments of the frame based on different ones of the shaping codes.

In some embodiments of any of the above apparatus, at least one of the shaping codes (e.g., 410, FIG. 4A) is a variable-input variable-output shaping code; and wherein the output block of bits has a fixed number of bits, and the frame has a fixed number of constellation symbols.

In some embodiments of any of the above apparatus, at least some of the shaping codes have different respective code rates (e.g., as in Eq. (1)).

In some embodiments of any of the above apparatus, the selector is configured to select (e.g., at 708, FIG. 7) a shaping code of the plurality, for use by the constellation demapper, based on a size of unprocessed portion of the frame and a number of unfilled vacancies for bits in the output block of bits (e.g., using Eqs. (2)-(3)).

In some embodiments of any of the above apparatus, the selector is configured to cause the constellation demapper to demap the frame according to the shaping codes and according to a constant-probability code (e.g., U, FIG. 6).

In some embodiments of any of the above apparatus, the apparatus further comprises a nonvolatile memory having stored therein a plurality of look-up tables (e.g., $620_1$-$620_N$, FIG. 3), each of said look-up tables representing a respective one of the shaping codes.

In some embodiments of any of the above apparatus, the data transmitter comprises an optical-to-electrical converter (e.g., 150, FIG. 10) configured to generate the sequence of digital samples in response to an optical input signal, the optical input signal being the modulated signal carrying the frame, the optical-to-electrical converter including a local-oscillator source (e.g., 156, FIG. 10) for coherently detecting the optical input signal.

According to yet another example embodiment disclosed above, e.g., in the summary section and/or in reference to any one or any combination of some or all of FIGS. 1-10, provided is an apparatus comprising: a shaping encoder (e.g., 300, FIG. 3) that comprises a constellation mapper (e.g., 336, FIG. 3) and a selector switch (e.g., 332, FIG. 3), the constellation mapper being configured to use a constellation and a plurality of shaping codes (e.g., C1, ..., CN, FIG. 3) to generate a frame of constellation symbols in response to an input block of bits, the selector switch being configured to connect the constellation mapper to a selected one of the shaping codes, the constellation including one or more constellation symbols having a first transmit energy and one or more constellation symbols having a second transmit energy that is greater than the first transmit energy, the shaping codes being configured to cause the one or more constellation symbols of the second transmit energy to occur less frequently than the one or more constellation symbols of the first transmit energy; and a data transmitter (e.g., 104, FIG. 1) coupled to the shaping encoder to transmit a modulated signal carrying the frame; and wherein the selector switch is configured (e.g., using 312/314, FIG. 3) to connect the constellation mapper to different selected shaping codes for generating different respective portions of the frame.

According to yet another example embodiment disclosed above, e.g., in the summary section and/or in reference to any one or any combination of some or all of FIGS. 1-10, provided is an apparatus comprising: a data receiver (e.g., 108, FIG. 1) configured to generate a sequence of digital samples in response to a modulated signal carrying a frame of constellation symbols, the digital samples representing measurements of the constellation symbols; and a shaping decoder (e.g., 600, FIG. 6) that comprises a constellation demapper (e.g., 636, FIG. 6) and a selector switch (e.g., 632, FIG. 6), the constellation demapper being configured to use a plurality of shaping codes (e.g., C1, ... CN, FIG. 6) to generate an output block of bits in response to the sequence of digital samples, the selector switch being configured to connect the constellation demapper to a selected one of the shaping codes; and wherein the selector switch is configured (e.g., using 612/614, FIG. 6) to connect the constellation demapper to different selected shaping codes for demapping different respective portions of the frame.

In some embodiments of the above apparatus, a constellation used by the demapper includes one or more constellation symbols having a first transmit energy and one or more constellation symbols having a second transmit energy that is greater than the first transmit energy; and wherein the shaping codes are configured to cause the one or more constellation symbols of the second transmit energy to occur less frequently in an encoded signal than the one or more constellation symbols of the first transmit energy.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled or referred to as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure.

What is claimed is:

1. An apparatus comprising:
a shaping encoder comprising a selector and a constellation mapper, the constellation mapper being capable of generating a frame of symbols of a constellation in response to receipt of an input block of bits, the selector being capable of causing the constellation mapper to generate the frame by selectively mapping bits of the input block into symbols of the frame using a plurality of shaping codes selected based on a target shaping-encoder rate, at least two of the shaping codes mapping bits into symbols of the constellation such that some symbols of higher energy have a lower probability of being generated by the mapping than other symbols of lower energy, the at least two of the shaping codes being variable-length shaping codes; and
a data transmitter coupled to the shaping encoder to transmit a modulated signal carrying the frame.

2. The apparatus of claim 1, wherein the selector is configured to cause the constellation mapper to generate different segments of the frame from the mappings of different ones of the shaping codes.

3. The apparatus of claim 2, wherein said different ones of the shaping codes have different respective code rates.

4. The apparatus of claim 1,
wherein at least one of the shaping codes is a variable-input variable-output shaping code; and
wherein the input block of bits has a fixed number of bits, and the frame has a fixed number of constellation symbols.

5. The apparatus of claim 1, wherein at least some of the shaping codes have different respective code rates.

6. The apparatus of claim 1, wherein the selector is configured to select a shaping code of the plurality for use by the constellation mapper based on a size of unprocessed portion of the input block of bits and a number of unfilled vacancies for symbols of the constellation in the frame.

7. The apparatus of claim 1, wherein the selector is capable of causing the constellation mapper to generate the frame according to the shaping codes and according to a constant-probability code, the constant-probability code mapping bits into said some symbols and said other symbols with equal probability.

8. The apparatus of claim 7, wherein the constant-probability code is a fixed-input fixed-output code.

9. The apparatus of claim 1, further comprising a non-volatile memory having stored therein a plurality of look-up tables, each of said look-up tables representing a respective one of the shaping codes.

10. The apparatus of claim 1, wherein the data transmitter comprises a data driver and an optical modulator configured to generate an optical output signal under control of the data driver, the optical output signal being the modulated signal carrying the frame, the data driver including the shaping encoder.

11. The apparatus of claim 1, further comprising:
a data receiver coupled to the data transmitter to receive the modulated signal and to recover therefrom the frame of constellation symbols; and
a shaping decoder configured to use the plurality of shaping codes to recover the input block of bits from the frame of constellation symbols recovered by the data receiver.

12. The apparatus of claim 1, wherein the data transmitter is configured to transmit the modulated signal such that at least some constellation symbols of the frame occupy different respective time slots.

13. An apparatus comprising:
a data receiver configured to generate a sequence of digital samples in response to receipt of a modulated signal carrying a frame of symbols of a constellation, the digital samples representing measurements of the symbols; and
a shaping decoder that comprises a constellation demapper and a selector, the selector being configured to cause the constellation demapper to selectively use a plurality of shaping codes to generate an output block of bits in response to the sequence of digital samples, at least two of the shaping codes being variable-length shaping codes selected based on a target shaping-encoder rate; and
wherein the at least two of the shaping codes map bits into symbols of the constellation such that some symbols of higher energy have a lower probability of being generated by the mapping than other symbols of lower energy.

14. The apparatus of claim 13, wherein the selector is configured to cause the constellation demapper to demap different segments of the frame based on different ones of the shaping codes.

15. The apparatus of claim 13,
wherein at least one of the shaping codes is a variable-input variable-output shaping code; and
wherein the output block of bits has a fixed number of bits, and the frame has a fixed number of constellation symbols.

16. The apparatus of claim 13, wherein at least some of the shaping codes have different respective code rates.

17. The apparatus of claim 13, wherein the selector is configured to select a shaping code of the plurality, for use by the constellation demapper, based on a size of unprocessed portion of the frame and a number of unfilled vacancies for bits in the output block.

18. The apparatus of claim 13, wherein the selector is configured to cause the constellation demapper to demap the frame according to the shaping codes and according to a constant-probability code.

19. The apparatus of claim 13, further comprising a nonvolatile memory having stored therein a plurality of look-up tables, each of said look-up tables representing a respective one of the shaping codes.

20. The apparatus of claim 13, wherein the data receiver comprises an optical-to-electrical converter configured to generate the sequence of digital samples in response to an optical input signal, the optical input signal being the modulated signal carrying the frame, the optical-to-electrical converter including a local-oscillator source for coherently detecting the optical input signal.

21. An apparatus comprising:
a shaping encoder comprising a selector and a constellation mapper, the constellation mapper being capable of generating a frame of symbols of a constellation in response to receipt of an input block of bits, the selector being capable of causing the constellation mapper to generate the frame by selectively mapping bits of the input block into symbols of the frame using a plurality of shaping codes, at least two of the shaping codes mapping bits into symbols of the constellation such that some symbols of higher energy have a lower probability of being generated by the mapping than other symbols of lower energy; and
a data transmitter coupled to the shaping encoder to transmit a modulated signal carrying the frame; and
wherein the selector is configured to select a shaping code of the plurality for use by the constellation mapper based on a size of unprocessed portion of the input block of bits and a number of unfilled vacancies for symbols of the constellation in the frame.

22. An apparatus comprising:
a data receiver configured to generate a sequence of digital samples in response to receipt of a modulated signal carrying a frame of symbols of a constellation, the digital samples representing measurements of the symbols; and
a shaping decoder that comprises a constellation demapper and a selector, the selector being configured to cause the constellation demapper to selectively use a plurality of shaping codes to generate an output block of bits in response to the sequence of digital samples;
wherein at least two of the shaping codes map bits into symbols of the constellation such that some symbols of higher energy have a lower probability of being generated by the mapping than other symbols of lower energy; and
wherein the selector is configured to select a shaping code of the plurality, for use by the constellation demapper, based on a size of unprocessed portion of the frame and a number of unfilled vacancies for bits in the output block.

* * * * *